United States Patent [19]

Gautier

[11] Patent Number: 4,729,284

[45] Date of Patent: Mar. 8, 1988

[54] STOP KEY FOR THE VALVE PLUNGER OF A BRAKING ASSISTANCE SERVOMOTOR AND A SERVOMOTOR EQUIPPED WITH SUCH A KEY

[76] Inventor: Jean-Pierre Gautier, 46 ter, Avenue Louis Blanc, 93600 Aulnay-sous-Bois, France

[21] Appl. No.: 763,510

[22] Filed: Aug. 8, 1985

[30] Foreign Application Priority Data

Aug. 16, 1984 [FR] France ................. 84 12864

[51] Int. Cl.⁴ ................................................ F15B 9/10
[52] U.S. Cl. ................................. 91/369 A; 91/376 R
[58] Field of Search ............. 91/369 A, 369 B, 369 C, 91/376 R

[56] References Cited

U.S. PATENT DOCUMENTS

| | | | |
|---|---|---|---|
| 2,993,478 | 7/1961 | Cripe | 121/48 |
| 3,688,647 | 9/1972 | Kytta | 91/369 C |
| 4,192,220 | 3/1980 | Tateoka | 92/369 B X |
| 4,406,213 | 9/1983 | Haar | 91/369 C X |
| 4,453,452 | 6/1984 | Meynier | 91/369 C X |
| 4,472,997 | 9/1984 | Ohmi | 91/369 C X |

FOREIGN PATENT DOCUMENTS

| | | |
|---|---|---|
| 3031224 | 3/1982 | Fed. Rep. of Germany . |
| 1242036 | 8/1960 | France . |
| 1389743 | 8/1965 | France . |
| 2121898 | 1/1984 | United Kingdom . |

Primary Examiner—Robert E. Garrett
Assistant Examiner—Mark Williamson

[57] ABSTRACT

The stop key (20) of the valve plunger (4) is made of metal wire and comprises a central portion having two lateral mounting strand parts (23) housed in grooves facing each other (13) in the radial opening (11) for mounting the key in the hub (1) of the servomotor, the two lateral parts (23) being joined by a central strand part in the shape of a V or a Y (24) and extending outward by parts forming arms (22) cooperating in elastic engagement with the outside periphery of the hub (1).

1 Claim, 3 Drawing Figures

STOP KEY FOR THE VALVE PLUNGER OF A BRAKING ASSISTANCE SERVOMOTOR AND A SERVOMOTOR EQUIPPED WITH SUCH A KEY

The present invention concerns stop keys for the distribution valve plunger of a braking assistance servomotor, typically of the vacuum type, positioned in a hub portion of an assistance piston of the servomotor, the key incorporating a central portion with a profiled end essentially in the shape of a V, intended to be engaged in a radial opening in the hub portion so as to cooperate in engagement with the plunger, and, formed in a single piece with the central portion, a pair of arms essentially in the shape of an arc of a circle, intended to cooperate in engagement with the outer periphery of the hub portion.

A stop key of this type is described in the document U.S. Pat. No. 3,688,647. The key in this document is made by stamping and forming a metal plate and is engaged in a radial opening in the hub portion of the assistance piston of the servomotor where it is held, partly by a finger of the central portion which is folded slightly at an angle, and by catches formed on the arms which are housed in corresponding depressions formed on the outer periphery of the hub portion. Such a "full" key obstructs the major portion of the radial opening in which it is mounted, so that it is necessary to provide, in the hub portion, a second radial opening establishing communication between the distribution valve and the rear chamber of the servomotor. In addition, owing to the fact that it is made by stamping a metal sheet, the arms of the key have a weak elasticity of their own, making it impossible to extend these arms beyond the central portion so that they approach one another and thus they are not able to ensure, on their own, the retention of the key in the hub, even by providing the above mentioned catches. The document G.B.-A-No. 2,095,778 describes a key which is identical except that the arms are extended by overmoulded rubber pads converging towards one another beyond the central portion in such a way as to surround more completely the periphery of the hub. Not only does this arrangement add considerably to the cost of manufacture of the key, but the reliability of this type of mounting appears somewhat questionable taking into account the large forces to which the key may be subjected in operation.

One object of the present invention is to provide a stop key of the type mentioned above of particularly simple construction, of low manufacturing cost, and occupying a minimum volume but enabling perfect retention in the hub to be ensured.

To achieve this, according to a feature of the invention, the key is made of metal wire, the central portion incorporating two lateral mounting strand parts which are essentially parallel, whose first ends are joined together by a central strand part generally in the shape of a V and each having its second end extended by an outer curved or inturned strand part forming the corresponding said arm.

Another object of the present invention is to provide a braking assistance servomotor arranged to be equipped with such a key.

Thus, according to another feature of the invention, a braking assistance servomotor, of the type incorporating, in the hub of an assistance piston, a distribution valve plunger coupled to an input rod of the servomotor and a key such as that previously defined engaged in a radial opening of the piston hub against a first axial wall of this opening, is characterized in that the radial opening incorporates laterally, at least in the region of the plunger, parallel radial grooves facing each other bounded axially, on one side, by the said first axial wall of the opening and accepting, essentially without play, the lateral mounting strand parts of the key.

Other features and advantages of the present invention will emerge from the following description of embodiments given by way of illustration but not limiting in any way, with reference to the accompanying drawings, in which.

In the description which follows and in the drawings, identical or similar components are identified by the same reference numbers, possibly primed.

Figure 1:
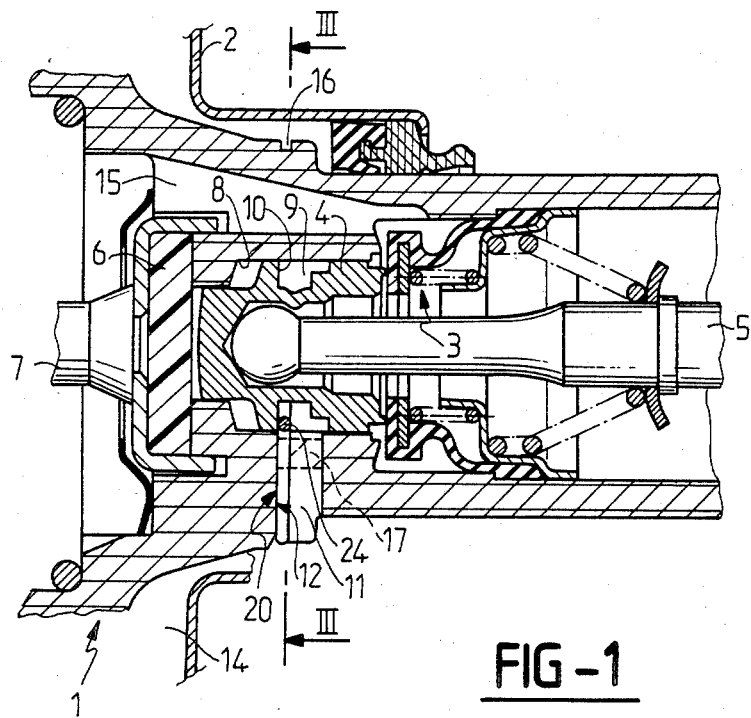
FIG. 1 is a partial longitudinal section of an assistance servomotor hub equipped with an abutment key according to the invention.

FIG. 1 shows the central portion of the hub (1) of an assistance piston of an assistance servomotor, in which a portion of the rear shell of the casing (2) is shown, of the general type described in the document U.S. Pat. No. 3,688,647 mentioned above, whose contents are assumed to be attached herewith for reference. A distribution valve means (3) is positioned in the hub portion (1), the distribution valve means being joined to a valve plunger (4) firmly fixed to the input rod (5) of the servomotor and being capable of cooperating with a reaction disc (6) mounted in the cupped end of the output rod (7) of the servomotor intended typically to be coupled to a piston of a master cylinder associated with the assistance servomotor. In a conventional manner, the plunger (4) slides axially in a central bore (8) of the hub (1) and incorporates a peripheral groove (9) defining an annular bearing surface (10) directed towards the input rod (5) and intended to cooperate with an abutment or stop key mounted in a radial opening (11) in the hub (1).

Figure 2:
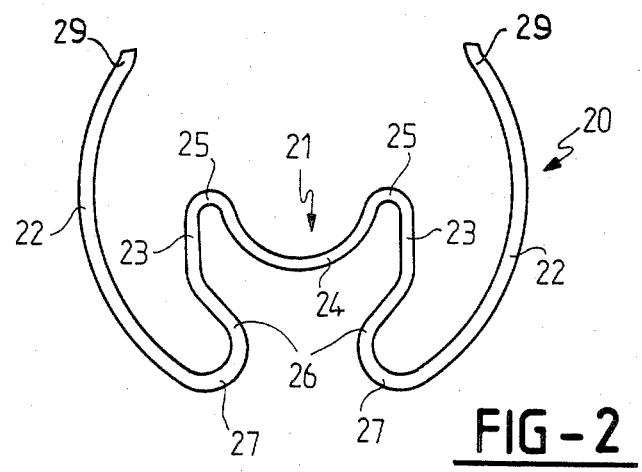
FIG. 2 is a plan view of a first embodiment of a key according to the invention.

In accordance with the invention, as shown clearly in FIGS. 2 and 3, the stop key, which is given the general reference 20, is made by shaping a spring steel wire of a diameter of between 1.3 and 2 mm, typically of 1.5 mm. The key (20) incorporates a central portion (21) intended to be engaged in the radial opening (11) of the hub (1), and two outer strand parts or arms (22). The key as a whole is symmetrical relative to a middle axis, the central portion (21) and the arms (22) being essentially coplanar. The central portion (21) incorporates two parallel lateral strand parts (23) joined together by a central strand part (24) which is essentially in the shape of an acute or rounded V having a radius which is slightly greater than the radius of the bottom of the annular groove (9) of the plunger (4), as illustrated. The central strand part (24) is joined to the adjacent ends of the lateral strand parts (23) by bends similar to a hairpin (25) which are essentially in line with the center of the circle of the central strand part (24). The other ends (26) of the lateral parts (23) converge towards one another and are extended outwards, via hairpin bends (27), by the arms (22) each having essentially the shape of an arc of a circle whose radius corresponds substantially to the outer diameter, in the region of the opening (11), of the hub (1) of the servomotor. The free ends (29) of the arms (22) extend beyond the central portion (21) in the direction away from the bends (27) and converge towards one another, the extreme ends (29) being slightly folded outwards to facilitate the elastic separation of the arms (22) during the placing and position of the key into the hub.

With reference now to FIGS. 1 and 3, the radial opening (11) of the hub (1) is defined axially on the side nearest the output rod (7), by a transverse flat surface (12) defining the reference plane at rest for the annular bearing surface (10) of the plunger (4) via the key (20). The opening (11) incorporates laterally, at least in the region of the plunger (4), two parallel radial grooves facing each other (13) bounded axially on one side by the axial wall (12) of the opening (11) and of an axial length which is determined so as to receive substantially without play, the lateral strand parts (23) as shown clearly in FIG. 3. The transverse distance (d) between the opposing bottom surfaces of these grooves (13) is essentially equal to the distance between the outer parallel edges of the lateral strand parts (23) of the central portion (21) of the key (20). In accordance with a feature of the invention, the opening (11) forms a fluid communication passage between the valve (3) and the rear chamber (14) of the servomotor, axial fluid passages (15), formed in the thickness of the hub (1), establishing communication between the valve (3) and the front chamber of the servomotor (not shown).

With such an arrangement, for the mounting operation, the key (20) is placed facing the radial opening (11), then introduced radially into the latter so as to bring the lateral mounting strand parts (23) into the parallel grooves (13), this insertion movement being effected with outward elastic deformation of the arms (22) until the inner edge of the latter comes to bear against the outer surface of the hub (1) in a final mounting configuration in which the arms (22) surround a major portion of the hub (1) thus preventing any accidental withdrawal of the key out of the opening (11). In this mounting configuration, the central strand part (24), the lateral strand parts (23), together with the bends (27) are held against the axial reference wall (12) of the opening (11), the reaction force exerted by the plunger (4) upon the key (20) being carried by the lateral parts (23) held in their grooves (13), the couple thus exerted on the central portion (21) of the key also being carried by the bends (27) held against the axial wall (12). To ensure accurate positioning of the arms (22) on the hub (1) and so as not to increase essentially the outer diameter of the latter owing to the arms (22), the latter may be housed in a peripheral groove (16) in the hub.

In the case where, in order to ensure a more rapid response of the valve (3) and to facilitate the passage of a large flow of fluid from the rear chamber (14) towards the valve (3), the radial opening (11) may be provided with a central portion (between the grooves (13)), of large axial length. However, in this case, there is a risk that problems will arise of mechanical behaviour, in operation, of the hub (1) in the region of the opening (11), taking into account particularly the presence of the passages (15). In addition, according to a feature of the invention, a projecting portion (17) may be provided in this case, extending axially from the axial wall of the opening (11) opposite the axial wall (12) and extending as far as the region of this first axial wall (12).

Figures 3A, 3B:
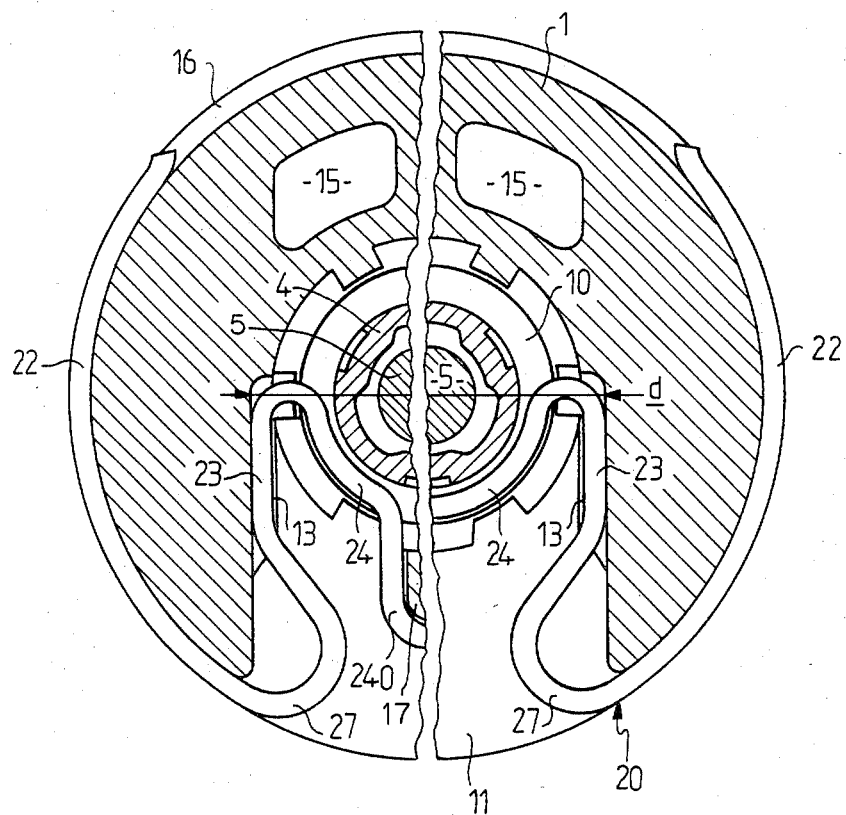
FIGS. 3a and 3b are transverse half-sections through the section plane III—III shown in FIG. 1 and showing respectively the arrangement of the key according to the embodiment shown in FIG. 2, and according to a variant of this embodiment.

The arrangement of the key according to the present invention in fact allows, as shown in FIG. 3b, this projecting portion (17) to be accommodated by providing for the central strand part (24) a configuration in the shape of a Y, the leg of which is formed by a bend in the shape of a rectangular U (240) interrupting centrally the V or the U of the central strand part (24) and engaging around the projecting portion (17) which is consequently shaped externally. The projecting portion (17) preferably passes from one side of the opening (11) to the other joining together the two axial walls facing each other of the latter, the projecting portion (17) being made as a single piece by moulding with the hub body (1).

Although the present invention is described above in relation to particular embodiments, it is not limited by them but on the contrary is capable of modifications and variants which will be apparent to a person versed in the art.

I claim:

1. A braking assistance servomotor, incorporating a piston hub, a plunger of a distribution valve coupled to an input rod of the servomotor, and a stop key for the plunger, the key comprising a central portion with an end shaped essentially in the shape of a U intended to be engaged in a radial opening in the hub in cooperative engagement with the plunger and, each formed in the shape of a single piece with said central portion, a pair of arms essentially in the shape of an ark of a circle cooperatively engaged with the outer periphery of the hub, said key being made of metal wire, the central portion comprising two substantially parallel lateral mounting strand parts whose first ends are joined together by a central strand part, and each mounting strand part having a second end extended by an outer curved strand part forming the corresponding arm, said radial opening comprising a central portion having axially spaced first and second axial walls, a pair of parallel facing grooves formed in lateral walls of said central opening contiguous with said first axial wall, the axial length of said central portion being greater than the axial length of the grooves, and a projecting portion extending axially from said second axial wall adjacent to said first axial wall.

* * * * *

UNITED STATES PATENT AND TRADEMARK OFFICE
CERTIFICATE OF CORRECTION

PATENT NO. : 4,729,284

DATED : March 8, 1988

INVENTOR(S) : Jean-Pierre Gautier

It is certified that error appears in the above-identified patent and that said Letters Patent is hereby corrected as shown below:

On the title page, left column, add --[73]  Assignee:  Bendix France--.

Signed and Sealed this

Seventeenth Day of April, 1990

Attest:

HARRY F. MANBECK, JR.

*Attesting Officer*  *Commissioner of Patents and Trademarks*